(12) United States Patent
Takezaki et al.

(10) Patent No.: US 7,141,889 B2
(45) Date of Patent: Nov. 28, 2006

(54) AUTOMOBILE CONTROLLER USING BIOLOGICAL INFORMATION, AND SYSTEM AND METHOD WHICH USE THE AUTOMOBILE CONTROLLER

(75) Inventors: Jiro Takezaki, Hitachinaka (JP); Naoto Miura, Kokubunji (JP); Takafumi Miyatake, Hachiouji (JP); Akio Nagasaka, Kokubunji (JP); Satoru Kuragaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 415 days.

(21) Appl. No.: 10/292,543

(22) Filed: Nov. 13, 2002

(65) Prior Publication Data

US 2003/0090154 A1    May 15, 2003

(30) Foreign Application Priority Data

Nov. 14, 2001   (JP)   ............................. 2001-348173

(51) Int. Cl.
*B60R 25/04* (2006.01)
(52) U.S. Cl. .................... 307/10.3; 307/10.2; 180/287
(58) Field of Classification Search ............... 307/10.3, 307/9.1, 10.2; 180/287; 340/5.1, 5.2
See application file for complete search history.

(56) References Cited

U.S. PATENT DOCUMENTS

| | | | |
|---|---|---|---|
| 5,055,658 A | | 10/1991 | Cockburn |
| 5,224,174 A | * | 6/1993 | Schneider et al. .......... 382/124 |
| 5,291,067 A | * | 3/1994 | Nakajima et al. ............ 307/9.1 |
| 5,663,709 A | * | 9/1997 | Juang ......................... 340/468 |
| 5,704,008 A | | 12/1997 | Duvall, Jr. |
| 6,100,811 A | * | 8/2000 | Hsu et al. ................... 340/5.83 |
| 6,181,026 B1 | * | 1/2001 | Treharne et al. ........... 307/10.3 |
| 6,898,797 B1 | * | 5/2005 | Okamoto ..................... 720/726 |
| 2001/0027526 A1 | * | 10/2001 | English et al. .............. 713/201 |
| 2002/0028004 A1 | | 3/2002 | Miura et al. ................ 382/124 |
| 2002/0048014 A1 | | 4/2002 | Kono et al. ................... 356/71 |
| 2003/0012415 A1 | * | 1/2003 | Cossel ........................ 382/124 |
| 2003/0016345 A1 | | 1/2003 | Nagasaka et al. ............. 356/71 |

FOREIGN PATENT DOCUMENTS

| | | |
|---|---|---|
| DE | 19707058 | 9/1998 |
| EP | 695675 A1 * | 2/1996 |
| EP | 0761514 | 3/1997 |
| EP | 1312519 | 5/2003 |
| GB | 2288680 | 10/1995 |
| JP | 01284679 | 11/1989 |
| JP | 04160493 A * | 6/1992 |

OTHER PUBLICATIONS

Translation of JP2000-352245 A.*

* cited by examiner

Primary Examiner—Brian Sircus
Assistant Examiner—Daniel J Cavallari
(74) Attorney, Agent, or Firm—Crowell & Moring LLP (57) ABSTRACT

Highly convenient automobile engine starting uses an individual authentication device which utilizes biological information and provides a security function required when starting the engine, while protecting a sensor for receiving the biological information. An engine starting system can comprise an ignition switch for controlling a state of an automobile; a key for changing a state of the ignition switch; a registration key for registering biological information; a switch for starting an engine; a sensor for inputting biological information; a device for storing biological information; a collating unit for collating the inputted biological information with the stored biological information; and a lid for covering the sensor of an authentication device.

6 Claims, 10 Drawing Sheets

ID

AUTOMOBILE CONTROLLER USING BIOLOGICAL INFORMATION, AND SYSTEM AND METHOD WHICH USE THE AUTOMOBILE CONTROLLER

FIELD OF THE INVENTION

The present invention relates to control of an automobile which utilizes biological information.

BACKGROUND OF THE INVENTION

In order to start an automobile, a key is inserted into an ignition switch, and then the key is turned. As a result, a state of the automobile is changed, causing an engine to start. At this time, if the key is stolen, if the lock is picked or in other similar cases, there is a possibility that the automobile will be driven by a malicious person or other non-owner of the automobile. A method for starting an automobile having an immobilizer function is described in Japanese Patent Laid-open No. 2000-108848. According to this method, only a key in which an IC called a transponder is embedded can start an engine, which prevents lock picking, or use of a copied key. In addition, a method for authenticating an individual, which uses a finger-vein pattern as biological information in order to increase security, is described in Japanese Patent Laid-open No. authentication of an individual using biological information and a key switch are combined is described in Japanese Patent Laid-open No. 2000-352245.

SUMMARY OF THE INVENTION

The present invention provides a system that comprises: an ignition switch for controlling a state of an automobile; a key for changing a state of the ignition switch; and a function of authenticating an individual, which uses biological information; wherein an authentication start detector performs authentication using biological information; and an engine is started according to the key and the biological information.

DETAILED DESCRIPTION OF PREFERRED EMBODIMENTS

An example of a method for starting an engine with high security is the method described in Japanese Patent Laid-open No. 2000-352245 or the like in which a biological authentication device is provided; and if it is judged that inputted biological information matches registered biological information, an engine is started. However, when the method is used in an environment such as an automobile, various problems arise.

For example, if it takes a long time to perform authentication when starting an automobile, a driver is irritated. In addition to it, if the driver cannot start the automobile quickly in an emergency, a safety problem may also arise.

Further, if such a biological authentication device is used, a driver can touch a sensor of the biological authentication device, which poses the following problems: the sensor gets out of order due to mischief; and the sensor is broken on purpose by someone else.

Additionally, it is necessary to perform authentication processing by the biological authentication device every time the engine is started. Therefore, a method for starting an engine must be so devised that an engine can be restarted quickly in an emergency including the so-called engine stall.

Moreover, an automobile is generally required to allow a plurality of drivers to drive the automobile. To be more specific, what is required is a function that enables a user to register and delete drivers freely and securely for the user's convenience after the automobile is given to the user. However, such a function has not been taken into consideration until now.

The present invention provides a high-security engine starting system used in an automobile, in which safety and usability in an emergency are taken into consideration.

The present invention provides an engine starting system which enables a driver to start an engine without putting stress on the driver in an automobile environment. This system comprises an ignition switch for controlling a state of an automobile; a key for changing a state of the ignition switch; and a function of authenticating an individual, which uses biological information. In the system, an authentication start detector performs authentication using biological information; and an engine is started according to the key and the biological information.

In addition, to restart an engine quickly in an emergency, a term of validity is given to the result of the authentication by the individual authentication function. If it is within the term of validity, the engine is started without performing the individual authentication.

Moreover, to allow a plurality of drivers to use the system, the system comprises a switching unit for switching to a mode in which biological information is registered. A driver is registered in a driver registration mode.

Further, to prevent a failure in operation due to mischief, a sensor unit for reading biological information is provided with a lid which opens only when reading biological information.

In the present invention, at least one of the above-mentioned objects is achieved by each of the characteristics, and advantages produced by combining the characteristics.

Embodiments according to the present invention will be described in detail below.

Figure 1:
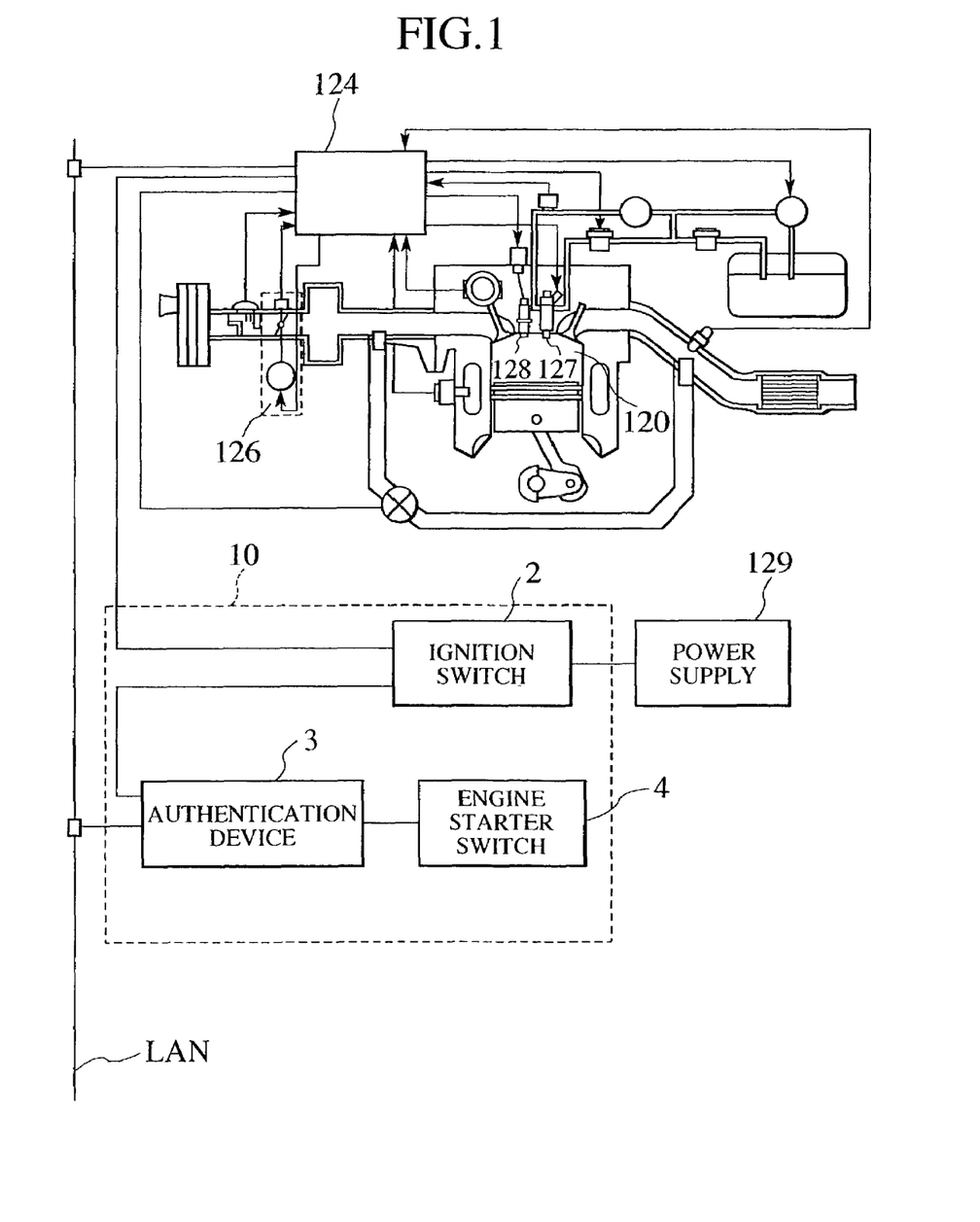
FIG. 1 is a diagram illustrating a system configuration which realizes the present invention.

FIG. 1 illustrates an engine starting system according to one embodiment of the present invention.

This system comprises an engine control unit 124, an electronic control throttle 126, a fuel injection valve 127, a spark plug 128, a starter (not shown), a power supply 129, an ignition switch 2, an engine starter switch 4, and a biological authentication device 3.

The ignition switch 2, the engine starter switch 4, and the biological authentication device 3 are mounted on, for example, a front panel 10 close to a driving seat in a vehicular compartment.

The engine control unit 124 is connected to the authentication device 3 so that they can communicate with each other via a local area network (LAN), or the like. There are various kinds of LANs. However, if the Control Area Network (CAN) which becomes prevalent is used, the communication can be easily realized.

Figure 2:
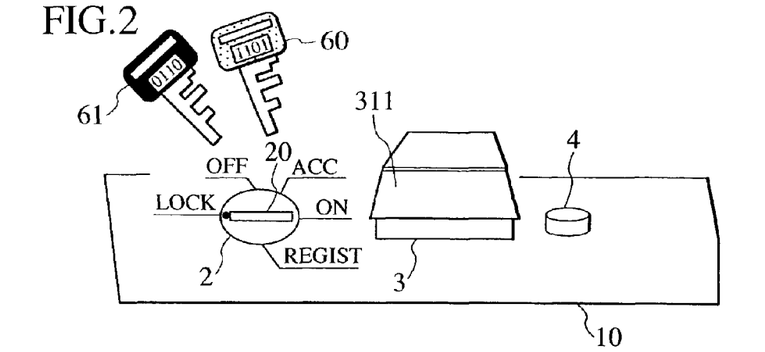
FIG. 2 is a diagram illustrating a configuration of a front panel.

FIG. 2 illustrates a configuration of the front panel 10 of an automobile. On the front panel 10, the following are mounted: the ignition switch 2 which changes a state of an automobile such as start and stop; the biological authentication device 3 for authenticating biological information; and the engine starter switch 4 for starting an engine.

Although this embodiment will be described on the assumption that finger veins are used for biological information, the biological authentication device 3 can use fingerprints, irises, voice, a palm, a face, handwriting, veins of the back of the hand or the like.

Keys that can be inserted into a keyhole 20 opening in the ignition switch 2 are a key 60 that is used when starting an engine and a registration key 61 that is used when registering biological information with the biological authentication device 3. In this manner, the use of the key for registering biological information separately from the key for starting an engine can provide higher security.

The ignition switch 2 can be in one of the following states: a state in which a steering wheel is locked (LOCK); a state in which the power supply is off (OFF); a state in which accessories are supplied with power (ACC); a state in which an engine can be started (ON); and a state in which a driver can be registered (RGIST), which will be described later.

Here, in the embodiment of the present invention, the engine starter switch 4 for starting an engine and the ignition switch are separately illustrated. However, the following method may also be used: as is the case with the existing ignition switch, providing a state in which a starter is started (START) next to ON; and after biological authentication is completed, the key can be turned to START, or turning the key to START causes the engine to start. In this case, as is the case with the existing ignition switch, it is possible to use a mechanism which returns the key to ON after turning the key to START.

The biological authentication device 3 is provided with a lid 311 that covers the biological authentication device, or that is a cover unit for covering an input unit, or a sensor unit, for inputting biological information of the biological authentication device. When the lid 311 is closed, it is locked. Therefore, the lid 311 cannot be opened on purpose. As the need arises, the lid 311 is unlocked before it opens. From the viewpoint of security, the following method can also be used: if the lid is opened in a state in which the lid is locked, or if the biological authentication device is started up in a state in which the lid is locked, processing of biological authentication is interrupted or stopped.

Figure 9:
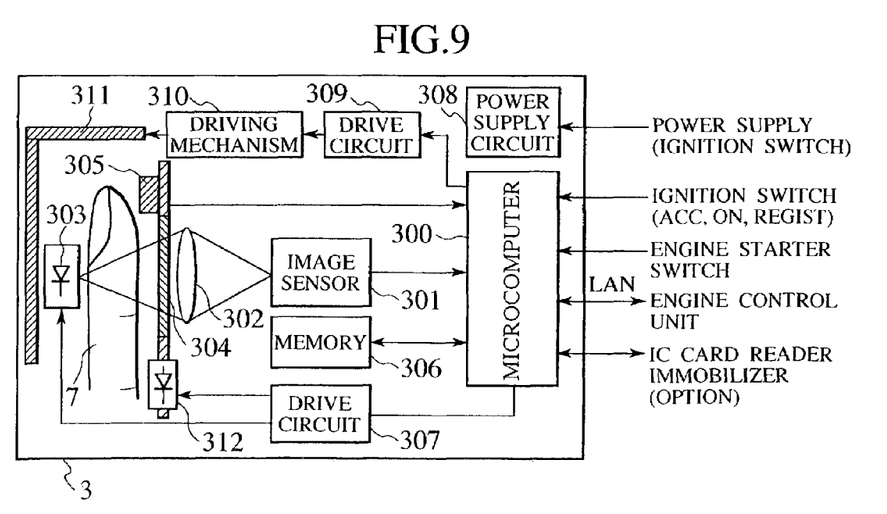
FIG. 9 is a block diagram illustrating a detailed configuration of the authentication device.

The biological authentication device 3 can be realized as, for example, a device having a configuration shown in FIG. 9.

The biological authentication device 3 shown in FIG. 9 is an example of an authentication device using finger veins. The biological authentication device 3 comprises the following: a microcomputer 300; an image sensor 301; a lens 302; an indicator 312; an infrared radiation source 303; an infrared filter 304; a drive circuit 307 for driving the infrared radiation source 303 and the indicator 312; an nonvolatile memory 306 connected to the microcomputer 300; an authentication starting switch 305; the lid 311; a driving mechanism 310 which locks or unlocks the lid 311; a drive circuit 309 for driving the driving mechanism 310; and a power supply circuit 308. When a finger 7 which is a target to be recognized is placed between the infrared radiation source 303 and the infrared filter 304, infrared rays are absorbed by hemoglobin of blood. Accordingly, a pattern image of blood vessels is formed on the image sensor 301. When finger authentication is performed, a blood vessel pattern of part of a finger is used for the authentication. In this case, properly defining part of the finger to be recognized improves accuracy in authentication. Therefore, in this embodiment, the authentication starting switch 305 which is a push button type switch is provided at the most appropriate position so that it is possible to instruct start of authentication after the finger is inserted. Because an action of pushing with a finger regulates a position of the finger relative to the image sensor 301, acquisition of a stable image becomes possible, which improves performance of authentication.

The formed image is converted into an electric signal by the image sensor 301 before the converted signal is inputted into the microcomputer 300.

When the ignition switch 2 is in a state of ACC, ON, or REGIST, the power supply circuit 308 is supplied with power from outside so as to power an internal circuit. In addition, because a signal of the engine starter switch 4 is inputted, the microcomputer 300 can read a state of the engine starter switch 4. Moreover, the biological authentication device 3 is so devised that the microcomputer 300 is connected to an engine control unit 124 via a LAN. Moreover, optionally the biological authentication device 3 is so devised that the microcomputer 300 can be connected to an IC card reader and an immobilizer by communication means.

Figure 3:
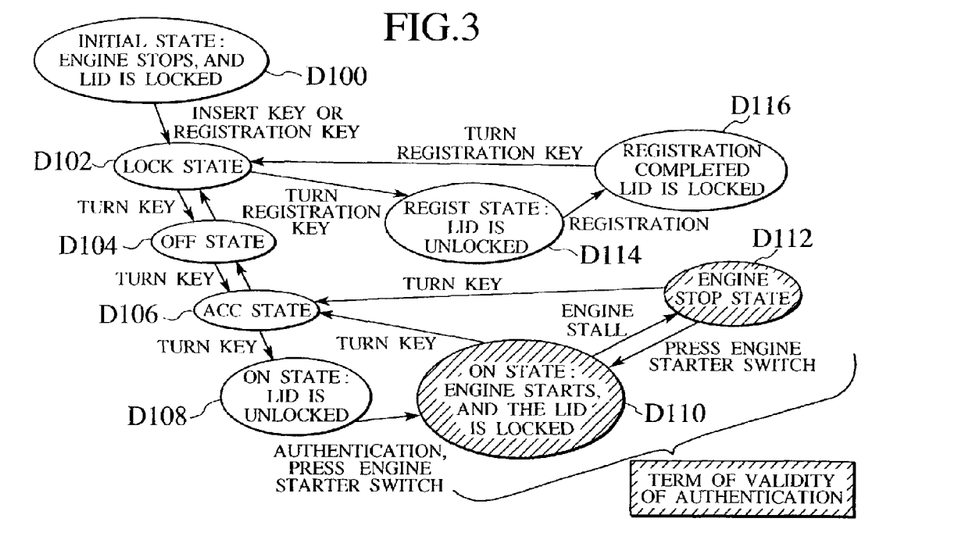
FIG. 3 is a diagram illustrating a state transition example of an engine starting system according to the present invention.

FIG. 3 is a transition diagram illustrating states of the engine, the ignition switch, and the biological authentication device 3. This figure shows a term of validity of authentication in each state as an example. When the key 60 is inserted into the ignition switch 2 in an initial state D100 in which an engine of an automobile completely stops and the automobile parks in a garage or the like, the ignition switch 2 is in a state D102 in which a steering wheel is locked (LOCK state). If a user of the automobile inserts the key 60 into the ignition switch 2 and then turns the key 60, the ignition switch 2 enters a state D104 in which an electric system is completely powered off (OFF state). If the user further turns the key 60, the state changes to a state D106 in which in-vehicle accessories are energized (ACC state).

While keeping in this state, the authentication device is supplied with power to enter a state in which operation is prepared. Because the lid 311 which covers a sensor of the biological authentication device 3 is closed in these states (D100 through D106), the lid 311 cannot be opened. When the user further turns the key 60 so that the authentication device 3 enters a state D108 in which authentication operation can be performed (ON state), the lid 311 which covers the sensor unit for receiving biological information opens. Subsequently, biological information is inputted. At this time, the biological authentication device 3 collates the inputted biological information with biological information stored beforehand in the biological authentication device 3. As a result of the collation, if the user is authenticated, the user is allowed to start the engine. If not, the user cannot start the engine. In addition, if the user is authenticated, or if the authentication processing ended, the lid 311 is closed again.

When the authentication is completed, which allows the user to start the engine, pressing the engine starter switch 4 causes the engine to enter a start state D110. Moreover, at the time when the authentication is completed, a term of validity of the authentication starts. During the period of time, the user can start the engine without performing biological authentication. States included in a range of the term of validity are the engine start state D110 and the engine stop state D112. In FIG. 3, these states are indicated by gray-colored circles.

After the engine starts, the user can drive the automobile. If the user wants to stop the engine, turning the key 60 to switch the ignition switch 2 to the ACC state D106 causes the engine to stop. Moreover, because a state of the ignition switch 2 is changed to that other than the ON state, the term of validity of the authentication terminates. At this time, if the user wants to restart the engine, the user is required to perform authentication again. Accordingly, even if the key 60 remains in the ignition switch 2 because the user has forgotten to remove the key, someone else cannot start the engine.

During driving, even if the engine enters the stop state D112 due to an engine stall or the like while the ignition switch 2 remains in the ON state, this state is included in the term of validity of the authentication. Accordingly, only pressing the engine starter switch 4 permits the ignition switch 2 to enter the engine start state 110, which eliminates the need for individual authentication. Therefore, it is possible to start the automobile quickly even in an emergency. Additionally, if the user wants to go away from the automobile temporarily, turning the key 60 to stop the engine causes the ON state D108 to change to the ACC state 106, the OFF state 104, or the LOCK state D102. As a result, the term of validity of the authentication is invalidated. Accordingly, even if someone else presses an engine start button, the engine cannot be started. Moreover, if the user removes the key 60, the ignition switch 2 cannot enter the ON state D108, keeping the lid 311 closed. Therefore, even a touch on the individual authentication device is not possible.

If the user inserts the registration key 61 into the ignition switch 2 and then turns the registration key 61 while the ignition switch 2 is in the LOCK state D102, the ignition switch 2 enters the REGIST state D114. At this time, the lid 311 of the authentication device 3 opens, allowing the user to register biological information in the authentication device 3. To be more specific, biological information which is newly registered in the nonvolatile memory 306 is stored. As soon as the authentication device 3 enters a registration completed state D116, the lid 311 of the authentication device 3 closes. The user uses the registration key 61 to return the state of the ignition switch 2 to the LOCK state 102. As a result, a person who has registered the biological information can start the engine using the key 60 to drive the automobile.

Since the registration key 61 is not usually used, keeping the registration key 61 in a safe in a home, for example, improves security furthermore.

Figure 4:
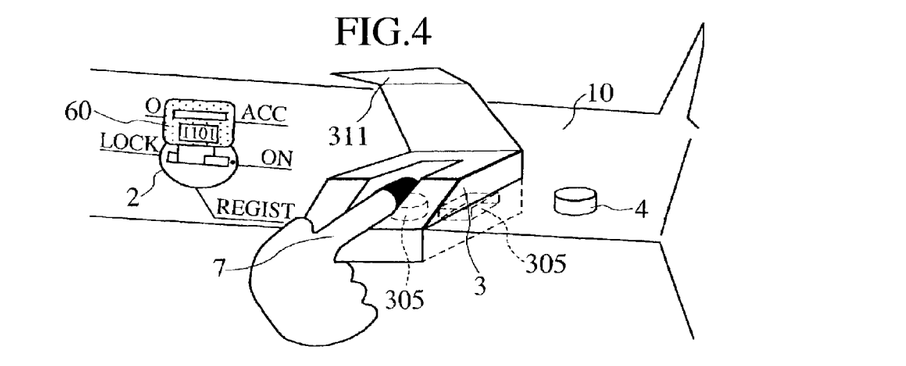
FIG. 4 is a diagram illustrating a configuration of a device which starts an engine using biological authentication.

FIG. 4 is a diagram illustrating states of a system when a state of the ignition switch 2 changes from the ON state to the engine start state. Since the ignition switch 2 is in the ON state, the lid 311 of the biological authentication device 3 is kept open. At this time, the sensor unit for receiving biological information comes out. While keeping in this state, a living body (in this example, the finger 7) is inserted into the sensor unit that reads biological information so that the information can be inputted into the biological authentication device 3. If the read biological information is judged to be the biological information registered beforehand in the nonvolatile memory 306 for storing biological information, the engine starter switch 4 becomes effective. Pressing the engine starter switch 4 which has become effective causes the engine to start. In this case, the authentication starting switch 305 mounted on the authentication device 3 may also be used to start the engine. In such a case, it is possible to start the engine in synchronization with the authentication processing.

Operation of the authentication device 3 is controlled by a program stored in the microcomputer 300 shown in FIG. 9. Operation of the microcomputer 300 will be described with reference to a flowchart in FIG. 10.

Figure 10:
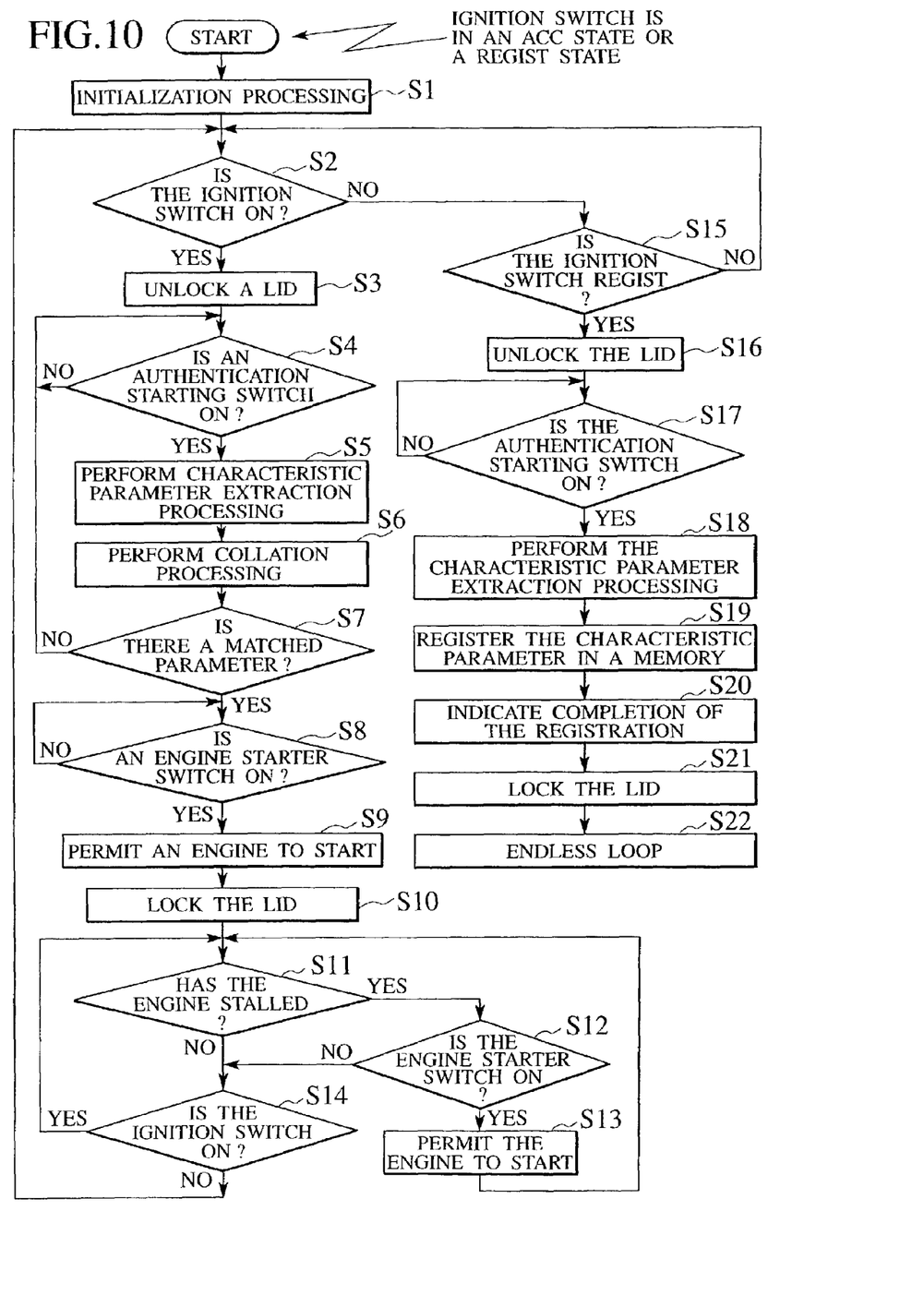
FIG. 10 is a flowchart illustrating operation of a program of a microcomputer in the authentication device.

When the ignition switch 2 enters the ACC state or the REGIST state, the authentication device 3 is supplied with power to start operation. The microcomputer 300 starts operation according to the program stored in a built-in memory.

To begin with, in step S1, the microcomputer 300 performs required initialization. For example, the initialization processing includes initialization of an internal memory, and initial settings of the image sensor 301. Next, in step S2, a state of the ignition switch 2 is checked, and a judgment is made as to whether or not the state of the ignition switch 2 is the ON state. If it is the ON state, the process proceeds to step S3. If not, the process branches to step S15. Processing in step S3 and afterward is processing in a usual engine start mode. To begin with, in step S3, in order to start authentication, the lid 311 is unlocked, and a driver is instructed to insert the finger 7. Next, in step S4, a judgment is made as to whether or not the authentication starting switch 305 has been pressed. If the switch has not been pressed, the process returns to step S4. If the switch has been pressed, the process proceeds to step S5 where parameters of characteristics of finger veins are extracted. The extraction processing will be described in detail later. Next, the process proceeds to step S6 where the extracted parameters of characteristics are collated with a parameter, or a plurality of parameters, which are stored beforehand in the nonvolatile memory 306. In step S7, the result of the collation is judged. If there is no matched parameter, the result is judged to be an unregistered user or a failure in collation before returning to step S4. If there is a matched parameter as a result of the collation, the driver is authenticated as an authorized driver. Next, in step S8, when the driver presses the engine starter switch 4, intention of the driver to start the engine is confirmed. While the engine starter switch 4 is not pressed, step S8 is repeated for waiting. If the switch has been pressed, the process proceeds to step S9 where a start permission command is issued to the engine control unit 124 via the LAN. Next, in step S10, the lid 311 is locked.

Subsequently to these processing, an engine stall, and a stop of the engine by the ignition switch 2, are monitored to perform proper processing. To be more specific, in step S11, a judgment is made as to whether or not the engine stalls. An operating state of the engine is monitored by the engine control unit 124. If the engine enters a state in which the engine stalls, the authentication device 3 is notified of the state immediately via the LAN. If the engine is not in the engine stall state, the process proceeds to a step 14. If the engine is in the engine stall state, a judgment is made in step S12 as to whether or not the engine starter switch 4 has been pressed. If the switch has been pressed, an engine start permission command is issued to the engine control unit 124 in step S13 before returning to the step 11. In step S1, if it is judged that the engine starter switch 4 has not been pressed, a judgment is made in step S14 as to whether or not the ignition switch 2 is still in the ON state. If the ON state is continued, the process returns to the step 11. If the ignition switch 2 is in a state other than ON, the engine is stopped. Therefore, the process returns to step S2. In step S15, whether or not the ignition switch 2 is in the REGIST state is checked. If the ignition switch 2 is not in the REGIST state, the process returns to step S2.

If it is judged that the ignition switch 2 is in the REGIST state, a registration mode for registering a new driver starts, and the following processing is executed.

In the first place, in step S16, the lid 311 is unlocked. Next, in step S17, a judgment of the authentication starting switch 2 is made. If the switch has not been pressed, the process returns to step S17. If the switch has been pressed, in step S18, characteristic parameters of finger veins of a driver to be newly registered are extracted. The extraction processing is completely the same as that in step S5. Next, in step S19, the extracted characteristic parameters are registered in the nonvolatile memory 306. Next, in step S20, the completion of the registration is displayed by switching the indicator 312 on. Next, in step S21, the lid 311 is locked. Lastly, in step S21, the process is on standby in an endless loop. If the state of the ignition switch 2 changes, the power supply is turned off, which causes this waiting state to exit.

Figure 11:
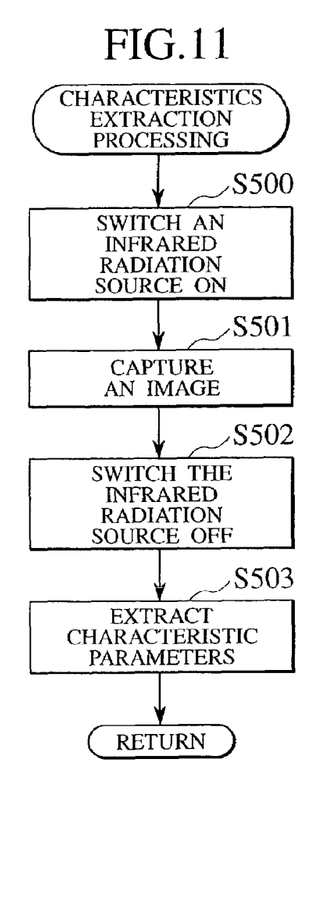
FIG. 11 is a flowchart illustrating processing of parameters of characteristics.

FIG. 11 is a diagram illustrating the processing in steps S5 and S18 in FIG. 10 in detail. To begin with, in step S500, the infrared radiation source 303 for irradiating the finger 7 is switched on. Next, in step S501, an image captured by the image sensor 301 is inputted. Next, in step S502, the infrared radiation source 303 is switched off. Next, in step S503, computation is performed for the image obtained in step S501 to extract characteristic parameters of veins. As disclosed in Japanese Patent Laid-Open No. 2001-184507, a method of the computation in this step can be realized by filter processing which is a combination of integral processing and differential processing.

Next, an engine start controlling method used for a cylinder fuel injection engine will be described. Because the cylinder fuel injection engine directly injects fuel in a combustion chamber, the engine cannot inject fuel while an exhaust valve opens. Therefore, the engine must discriminate a cylinder in an intake-compression stroke from others before injecting fuel. When the engine is started, a cylinder cannot be discriminated until the engine is rotated by a starter. Therefore, unless a cylinder is discriminated as fast as possible after the engine rotates and fuel injection is started, starting performance becomes worse.

Figure 5:
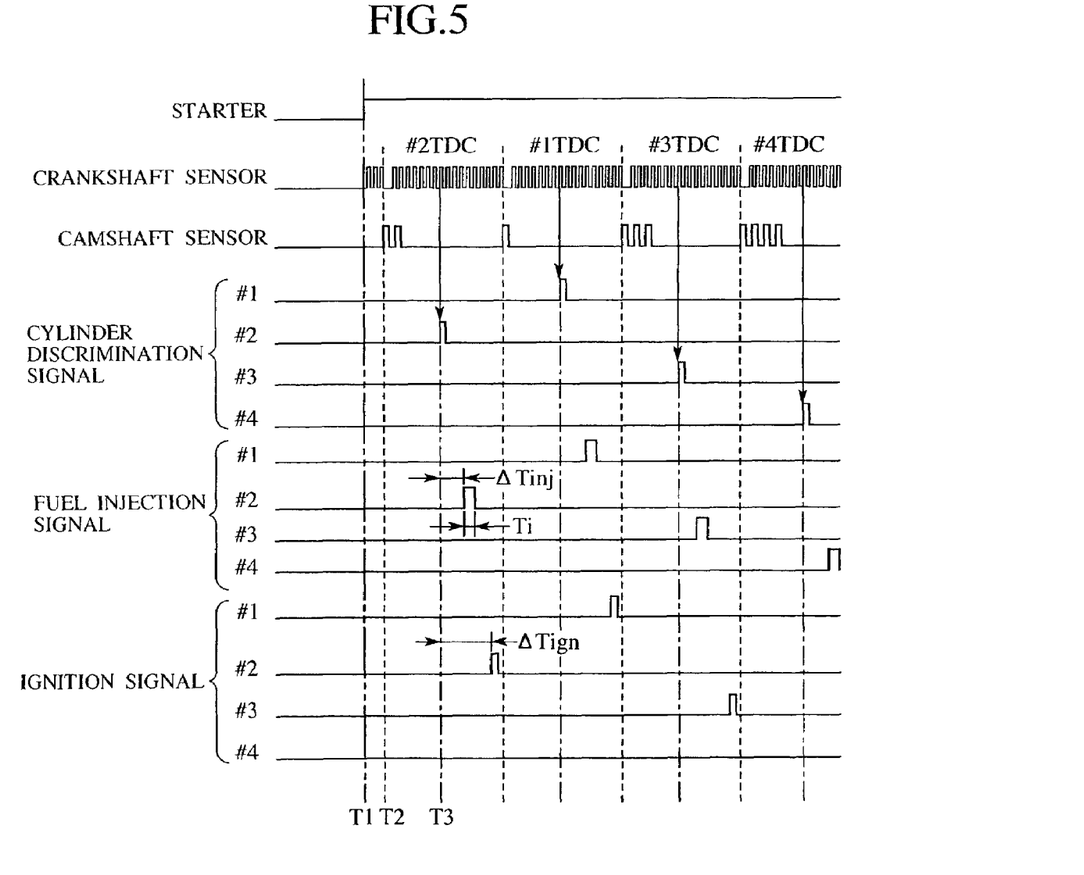
FIG. 5 is a time chart illustrating engine start control.

FIG. 5 illustrates a time chart of the engine start control. Starting a starter causes the engine to start rotating. As a result, a signal from a crankshaft sensor mounted on a crankshaft and a signal from a camshaft sensor mounted on a camshaft are inputted in a control unit.

Here, a four-cylinder engine will be described as an example. In the four-cylinder engine, the crankshaft has teeth in 10 degree intervals, the crankshaft sensor has a lack of tooth in 90 degree intervals, and the camshafts have one tooth, two teeth, three teeth, and four teeth, respectively.

Although the lack of tooth of the crankshaft sensor, is adjusted to a position of top dead center of a certain cylinder, it is not possible to discriminate a required cylinder only by this position. For this reason, using the camshaft sensor mounted on the camshaft, the number of teeth in a camshaft sensor signal found when the lack of tooth comes to the crankshaft sensor is detected. Then, judging from the number of teeth, a cylinder of which a compression top dead center corresponds to the next top dead center is discriminated. The timing of the cylinder discrimination is the ninth as the number of teeth of a crank angle sensor. Because the timing is just in the middle of the compression process, it is sufficiently in time for an injection period used for stratified starting.

The cylinder discrimination will be described with reference to FIG. 5. After the engine starts to rotate, a lack of tooth of the crankshaft sensor, coming first, corresponds to a top dead center of the fourth cylinder in reality. In synchronization with this, the number of teeth of the camshaft sensor is detected. If the number of teeth is two, it is judged that the next top dead center is a compression top dead center of the second cylinder. If the number of teeth is one, it is judged that the next top dead center is a compression top dead center of the first cylinder. An actual injection period is a delayed period $\Delta Tinj$ from a cylinder discrimination signal; and an injection pulse width is Ti. In addition, an ignition signal also becomes delayed time $\Delta Tign$ from the cylinder discrimination signal. Starting start control after the cylinder discrimination ensures combustion from the first ignition after injection is started, resulting in reliable start of the engine.

Figure 6:
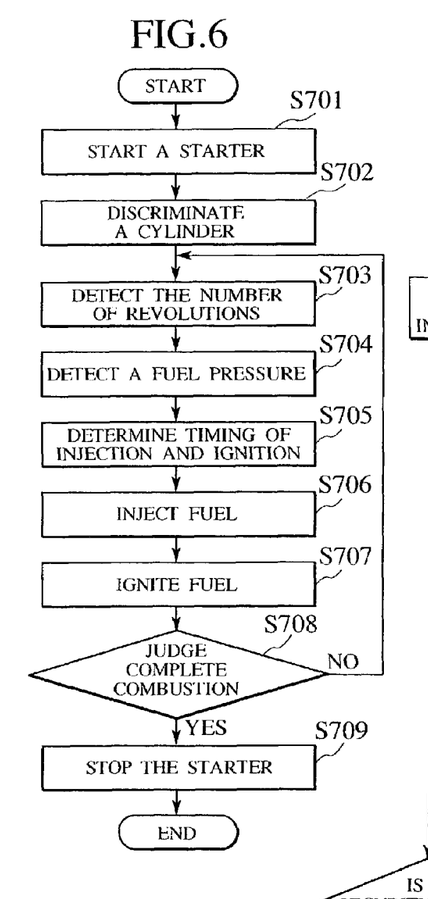
FIG. 6 is a flowchart illustrating the engine start control.

A program of a microcomputer built into the engine control unit 124 controls the engine. FIG. 6 is a flowchart illustrating the engine start control. As shown in FIG. 4, after the ignition switch 2 enters the ON state, if the authentication device 3 judges that biological information to be newly authenticated matches biological information registered beforehand in the nonvolatile memory 306 which stores biological information, and if the engine starter switch 4 is pressed, an engine start permission command is transmitted from the authentication device 3 as described above, which causes a starter to start (S701). Consequently, the engine control unit 124 controls the engine so that the engine starts cranking. The cylinder discrimination is performed using the crankshaft sensor and the camshaft sensor which input signals in synchronization with the revolution of the engine (S702). At this point of time, a cylinder from which injection is started is determined. Next, the number of revolutions is detected (S703), a fuel pressure is detected (S704), and thereby timing of injection and ignition, and the quantity of fuel injection, are determined (S705). The quantity of fuel injection is determined so that an air-fuel ratio in a whole cylinder becomes about 25. Injection (S706) and ignition (S707) are executed according to the result of the cylinder discrimination, and a judgment is made as to whether or not the number of engine revolutions reaches a given number of revolutions or more (S708). If the number of engine revolutions is still small, the process returns to step S703 where the number of engine revolutions and a fuel pressure are detected to set the timing of injection and ignition properly again for execution. When the number of engine revolutions sufficiently increases, the starter stops. As a result, the engine start control ends.

In the embodiment described above, after the authentication is successfully performed, if the engine starter switch 4 is pressed, the engine starts. However, the engine may also be allowed to start at the time of the successful authentication. In this case, as measures in the event of an engine stall, partially changing the processing of the authentication device 3, and making an addition to the processing, suffice. To be more specific, in FIG. 10, omitting the processing in step S8, and replacing the judgment processing of the engine starter switch 4 in step S12 with the unlock processing of the lid 311 and the judgment processing of the authentication starting switch 305 suffice.

In addition, in the embodiment described above, if the registration key 61 is copied for some reason or other, an outsider can register a driver easily inside an automobile. Assuming that there is such a state, or the like, an embodiment in which further improved security is provided will be described with reference to FIG. 7.

Figure 7:
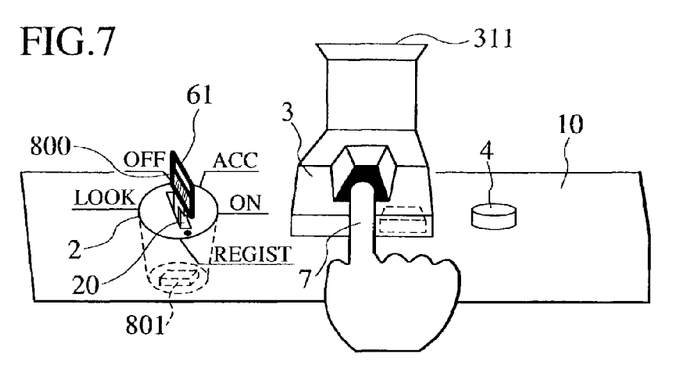
FIG. 7 is a configuration diagram of a device which registers biological information in an authentication device inside an automobile.

FIG. 7 is a diagram illustrating an example of a method for registering biological information, which further improves security.

When the registration key 61 is inserted in the keyhole 20, turning the registration key 61 can change a state of the ignition switch 2 to REGIST. At this time, if the key inserted in the keyhole 20 is not the registration key 61, the state of the ignition switch 2 cannot be changed to REGIST. However, if it is a copied key, the ignition switch 2 can enter the REGIST state. For this reason, whether or not the inserted key is the registration key 61 is judged by the immobilizer 801 using an identification number (ID) of the transponder 800 in the registration key 61. As shown in FIG. 9, the immobilizer 801 is configured to communicate with the authentication device 3. Accordingly, so long as the ID is not matched, even if a state of the ignition switch 2 can be changed to the REGIST state, it is not possible to enter a registration mode.

Therefore, even if a duplicate key, appearance of which is completely the same as the original key, is used, or even if a criminal means such as picking is used, it is possible to judge that the inserted key is not the authorized registration key 61. Because this technology is used in an antitheft device which has already been put to practical use in some automobile models, it can be easily realized.

Thus, strictly identifying the registration key 61 can prevent an outsider from registering biological information on purpose. In addition, providing a user with the key used for starting the engine and the registration key 61 separately enables the user to keep the registration key 61 at a safe place outside an automobile when the user drives. This prevents an outsider from easily registering biological information when the user carelessly goes away from the automobile temporarily without removing the key.

Figure 8:
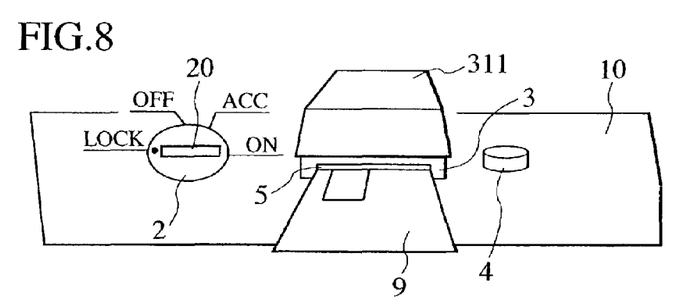
FIG. 8 is a configuration diagram of a device which registers biological information in an authentication device outside an automobile.

FIG. 8 illustrates another embodiment of a device for registering biological information in an automobile which does not have an immobilizer.

As described above, if the means for authenticating a key itself using the immobilizer cannot be used, and if the registration of biological information is allowed in an automobile, there is a possibility that an outsider forces the authentication device to enter the registration mode. In order to prevent it, preparing an authentication device for registration in an automobile dealer or a home for example, writing biological information in the IC card 9 for example, and inserting the IC card 9 into the IC card reader 5 installed in the automobile, enable the registration. Further, in order to prevent an outsider from writing biological information in the same IC card before inserting the IC card into the biological authentication device 3 installed in the automobile to register the outsider, an unique ID number is given to the authentication device for registration installed outside the automobile, the IC card, and the authentication device installed in the automobile. Each device is configured to operate only when its ID number completely corresponds to the other.

As shown in FIG. 9, the IC card reader 5 is so devised that it can be connected to the authentication device 3 through a communication line.

Next, operation of the microcomputer 300 in the authentication device 3, executed when a driver is registered using the IC card 9, will be described with reference to FIG. 12.

Figure 12:
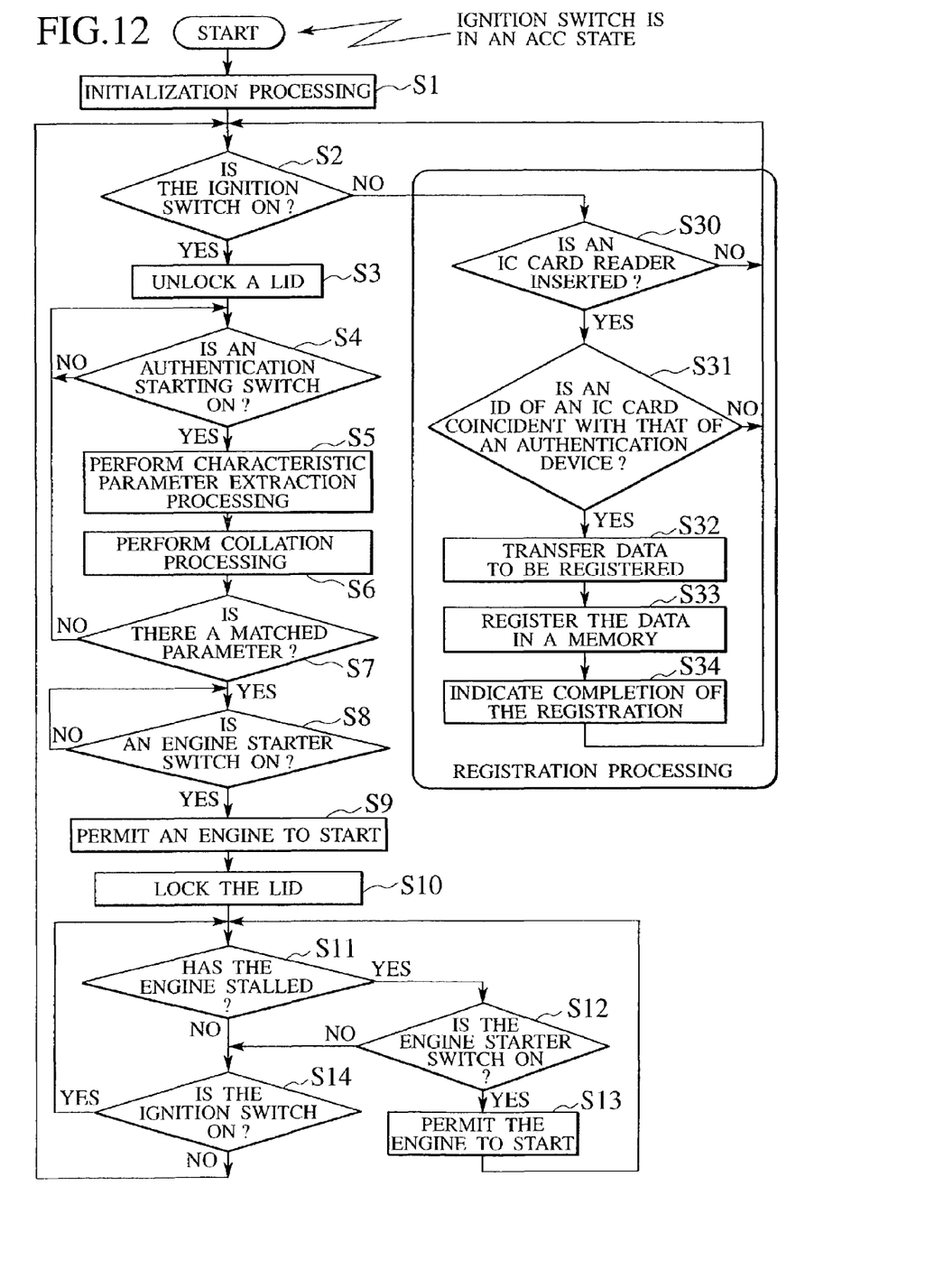
FIG. 12 is a flowchart illustrating an embodiment in which an IC card is used.

A flowchart shown in FIG. 12 is basically the same as that of the system using the registration key, which is shown in FIG. 10. Points of difference are conditions of power on and registration processing.

To be more specific, in the embodiment shown in FIG. 8, there is no registration key 61. This means that the ignition switch 2 has no REGIST state. Therefore, the authentication device 3 is supplied with power when the authentication device 3 enters the ACC state.

In FIG. 12, because processing other than the registration processing is similar to that in FIG. 10, description of usual engine start processing will be omitted. In step S2, if the ignition switch 2 is in the ACC state without entering the ON state, the registration processing is performed.

In the first place, in step S30, whether or not the IC card 9 has been inserted into the IC card reader 5 is checked. If the IC card 9 is not inserted, the process returns to step S2.

If the IC card 9 is inserted, an ID stored in the IC card 9 is read to compare the read ID with the ID stored in the nonvolatile memory 306. If the IDs do not match with each other as a result of the comparison, it is found out that an unauthorized IC card for registration has been inserted. Therefore, registration is refused before returning to step S2.

If the IDs are coincident with each other, authentication data for a new driver stored in the IC card 9 is transferred to the authentication device 3 in step S32, and then the authentication data is written into the nonvolatile memory 306 in step S33.

In step S34, the indicator 312 is switched on to inform a user of completion of the registration.

In this embodiment, actually changing to the registration mode in an automobile is extremely difficult, which leads to further improved security.

In the method used in the embodiment described above, registration data of the driver is created beforehand outside the automobile, and is then written into the authentication device 3 through the IC card 9. It is assumed that this method requires a dedicated registration device outside the automobile, producing a problem of how to secure a location where the device is installed, and a problem of how to manage the device. In this case, treating the IC card 9 itself as the registration key 61 can solve the problems.

Figure 13:
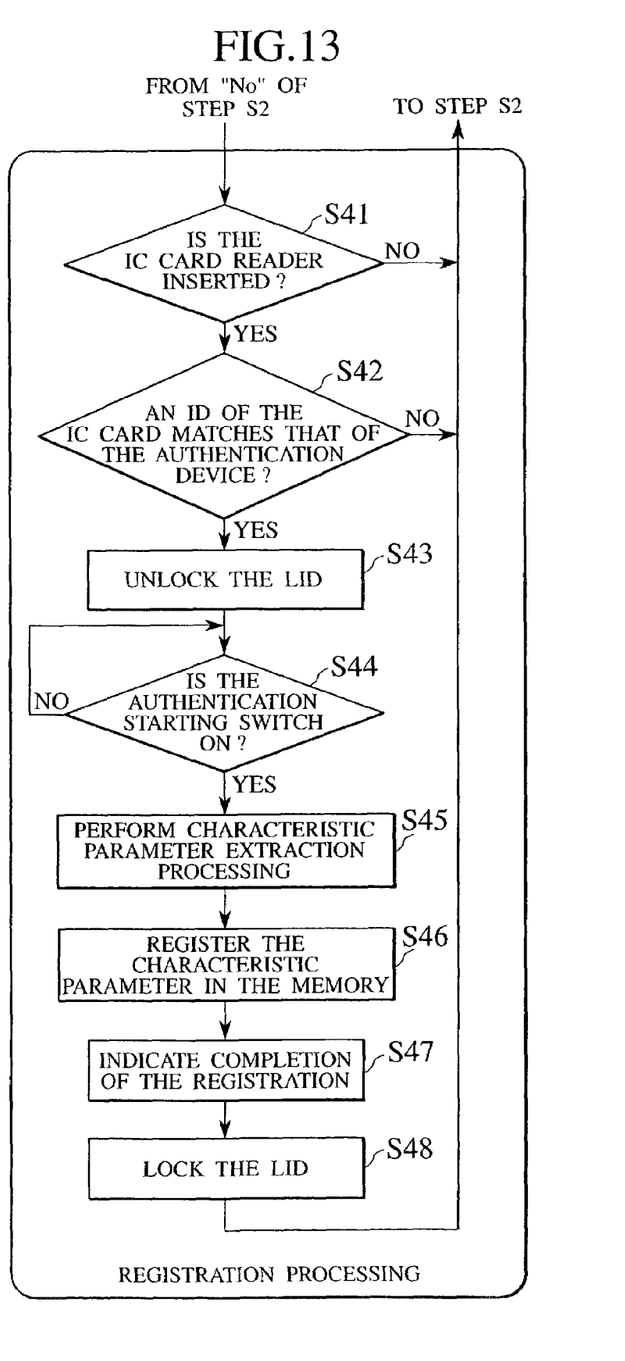
FIG. 13 is a flowchart illustrating another embodiment in which an IC card is used.

Although a configuration of the device is similar to that shown in FIG. 8, part of authentication registration processing is different. FIG. 13 illustrates only a changed part of the registration processing in the process flow shown in FIG. 12.

The usual engine start processing, which is not included in the registration processing, may be completely the same as that shown in FIG. 12.

To begin with, in step S41, whether or not the IC card 9 has been inserted into the IC card reader 5 is checked. If the IC card 9 is not inserted, the process returns to step S2.

If the IC card 9 is inserted, the process proceeds to step S42 where an ID stored in the IC card 9 is read and the read ID is compared with the ID stored in the nonvolatile memory 306. If the IDs do not match with each other as a result of the comparison, it is found out that an unauthorized IC card for registration has been inserted. Therefore, registration is refused before returning to step S2.

If the IDs are coincident with each other, the lid 311 is unlocked in step S43, and a judgment is made in step S44 as to whether or not the authentication-starting switch 305 has been pressed.

In step S44, the process waits until the switch is pressed.

As soon as the switch is pressed, characteristic parameter extraction processing is performed (S45). After that, the result is registered in the nonvolatile memory 306 (S46). Next, the indicator 312 is switched on to display completion of the registration (S47). Lastly, the lid 311 is locked before returning to step S2.

According to this embodiment, security is improved as compared with the case where the registration key 61 is used. In addition to it, even if there is no special device outside the automobile, a driver can newly be registered.

Figure 14:
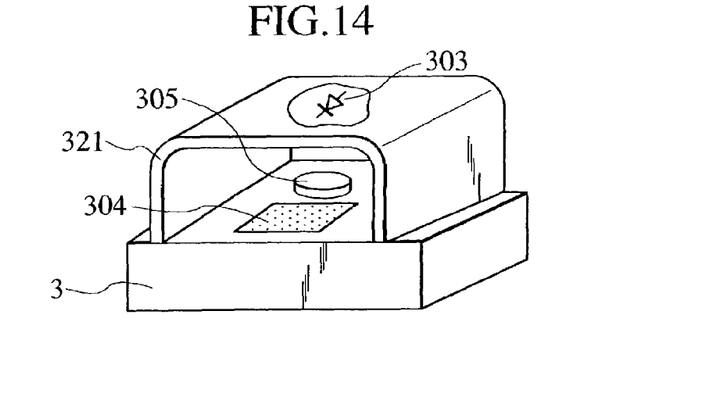
FIG. 14 is a configuration diagram illustrating another embodiment of an authentication device.

In the embodiment described above, the lid 311 which can open and close is used for the sensor unit of the authentication device 3. In addition to it, the engine starter switch 4 is provided. Therefore, a spatial constraint may arise at the time of installation in the automobile. In this case, use of an identifying device 3 having a structure as shown in FIG. 14 suffices. Since reference numerals in the figure which are similar to those used above denote similar parts, the explanation thereof will be omitted. Points of difference are the following: a cover 321 which is secured to a main body is used as a substitute for the movable lid 311; and the engine starter switch 4 is omitted. If the authentication method is finger-vein authentication, from among components of a sunbeam, for example, infrared rays become disturbance light. Therefore, a material which forbids at least infrared rays to pass therethrough can be used as a material of the cover 321. Preferably, if it is a material through which visible rays pass, rays of the indicator 312, for example, pass through the material. Accordingly, an operator can check the state through the cover 321, which is convenient. Further, an effect against dust floating in the automobile can also be expected.

Figure 15:
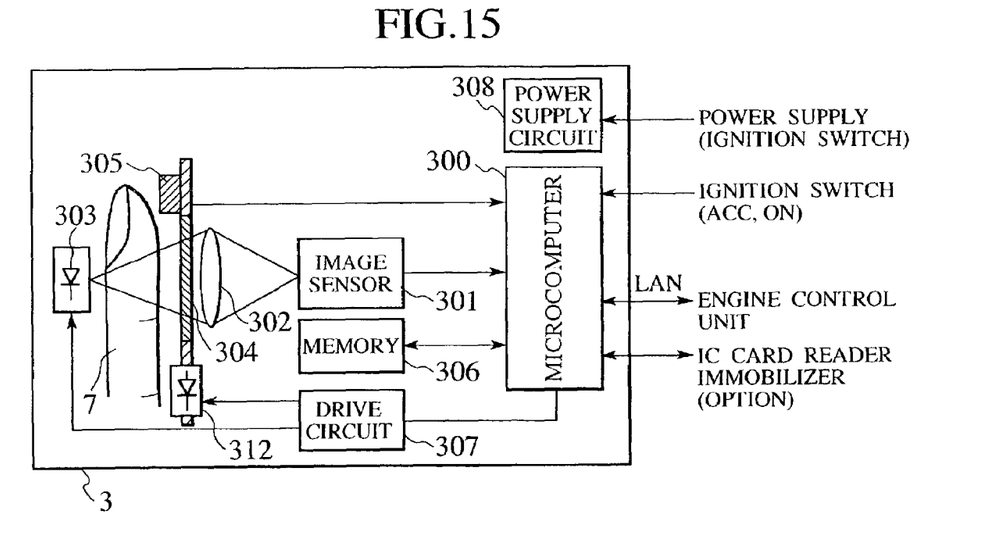
FIG. 15 is a circuit block diagram of an authentication device according to another embodiment.

In this case, a configuration of the authentication device 3 can be realized as shown in FIG. 15. A point which is different from the configuration in FIG. 9 is that the lid 311, the driving mechanism 310, the drive circuit 309, and input from the engine starter switch 4 are omitted. Since similar reference numerals denote similar parts, detailed description will be omitted.

Figure 16:
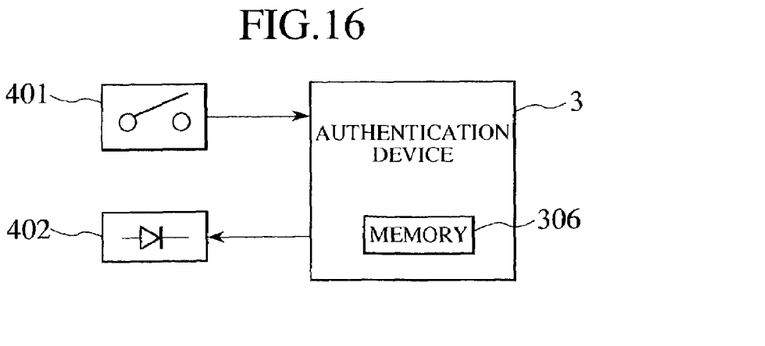
FIG. 16 is a configuration diagram illustrating a method for releasing security.

It is expected that a situation in which an automobile is temporarily lent to someone else arises. To be more specific, when parking service of a hotel or the like is used, an automobile key is handed to a clerk in charge to ask the clerk to move the automobile. In such a situation, it is troublesome to perform work of the driver registration in every case, and a problem of security also occurs. In such a case, providing a function that enables temporary cancellation of a security mode suffices. FIG. 16 illustrates an embodiment of a device that realizes such a function. The authentication device 3 is basically the same as that shown in FIG. 9. However, the authentication device shown in FIG. 15 is different from that shown in FIG. 9 in that a security mode setting switch 401 and a warning indicator 402 are provided outside. The security mode setting switch 401 and the warning indicator 402 are connected to the microcomputer 300. The microcomputer 300 reads a state of the switch, or controls indication. The security mode setting switch 401 is used for setting and canceling the security mode. In addition, the warning indicator 402 is configured to light up while the security mode is in a canceled state. The security mode is based on a design concept in which both of setting and cancellation are allowed only after individual authentication is performed.

Figure 17:
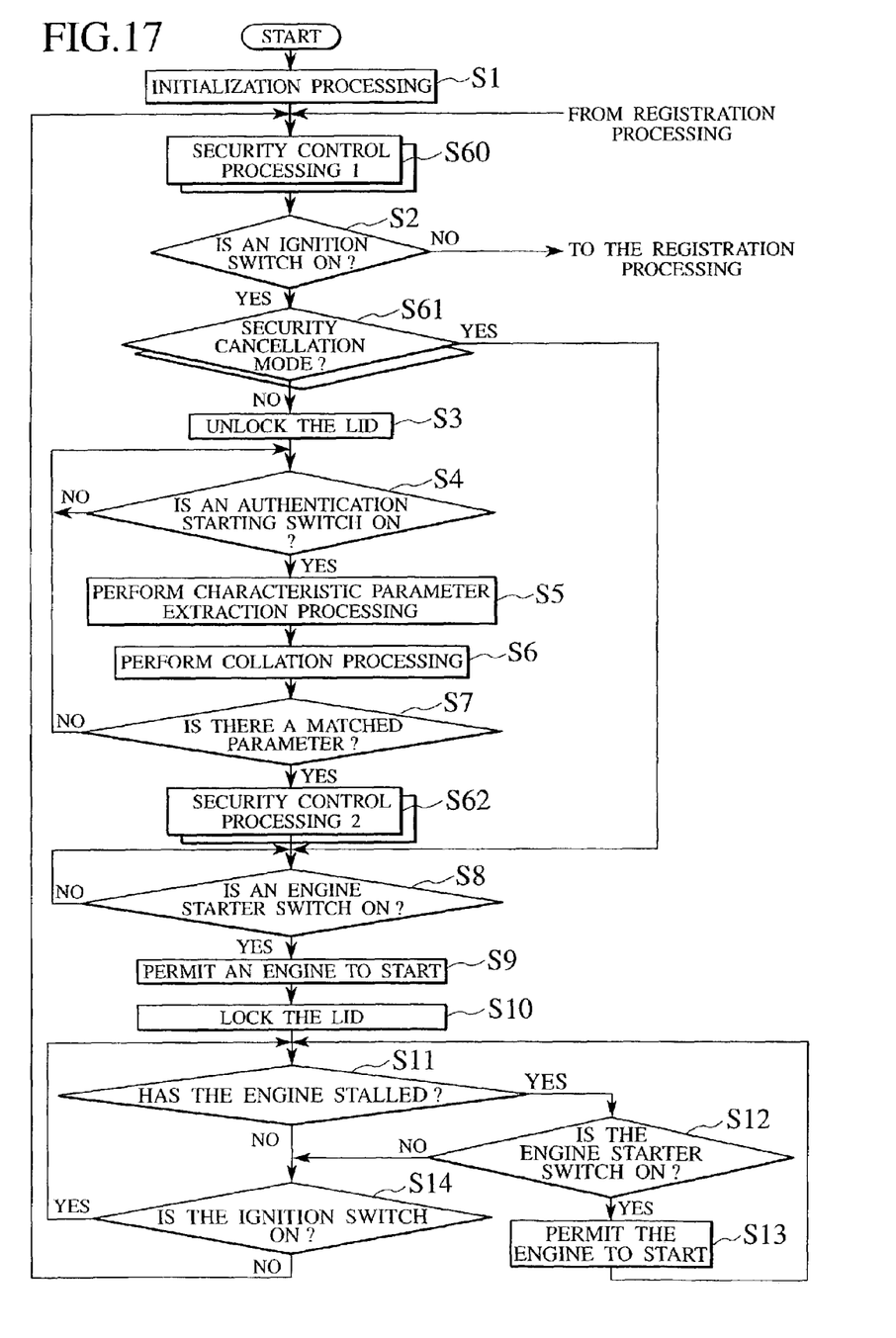
FIG. 17 is a flowchart illustrating a function of releasing security.

Next, an operation flow of the microcomputer 300 will be described with reference to FIG. 17. A flowchart of FIG. 17 is devised on the basis of the flowchart shown in FIG. 10. The flowchart of FIG. 17 is made by adding processing of steps S60, S61, and S62 to the processing in FIG. 10. Since similar reference numerals are used in FIG. 17 to denote similar processing described in FIG. 10, the description thereof will be omitted. Security control processing 1 (S60) after initialization processing (S1) is control processing of the warning indicator 312 in response to a current state of the security mode which is stored in the nonvolatile memory 306 of the authentication device 3. Details of the processing will be described later. Additionally, in step S61, the judgment is made such that, if the security mode is canceled, individual authentication is skipped, that is, the process directly jumps to step S8 where engine start processing is performed. In security control processing 2 (S62), a current security mode and the security mode setting switch 401 are judged, and then the security mode are set or cancelled accordingly. Because this processing can be performed only after a proper user finishes authentication, this eliminates the possibility that an unauthenticated user will set or cancel the security mode by mistake. Details on the security control processing 2 (S62) will be described later.

Figure 18:
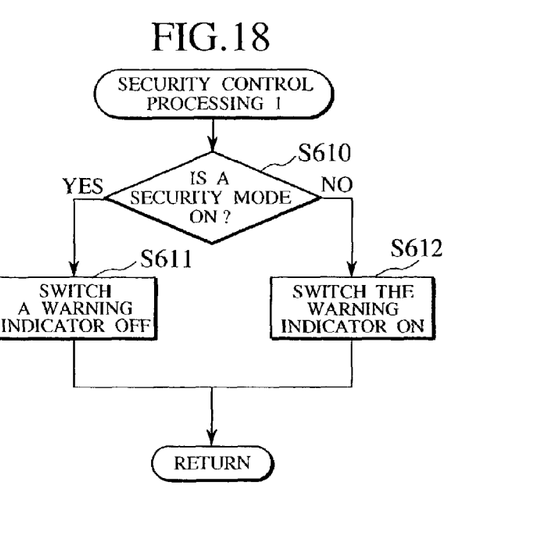
FIG. 18 is a flowchart detailing part of the processing shown in FIG. 17.

FIG. 18 illustrates the details on the security control processing 1 (S60).

In the first place, in step S610, a current state of the security mode stored in the nonvolatile memory 306 is read to judge the mode. If a security mode is currently set, the process proceeds to step S611 where the warning indicator 402 which warns that a security mode is canceled is switched off. In other words, since the security mode is on, a state in which the authentication is required is indicated. If the security mode is currently canceled, the warning indicator 402 is switched on in step S612 in order to inform a driver of an insecure state since the security mode is canceled. After the processing in the steps S611, S612 is completed, the security control processing 1 ends.

Figure 19:
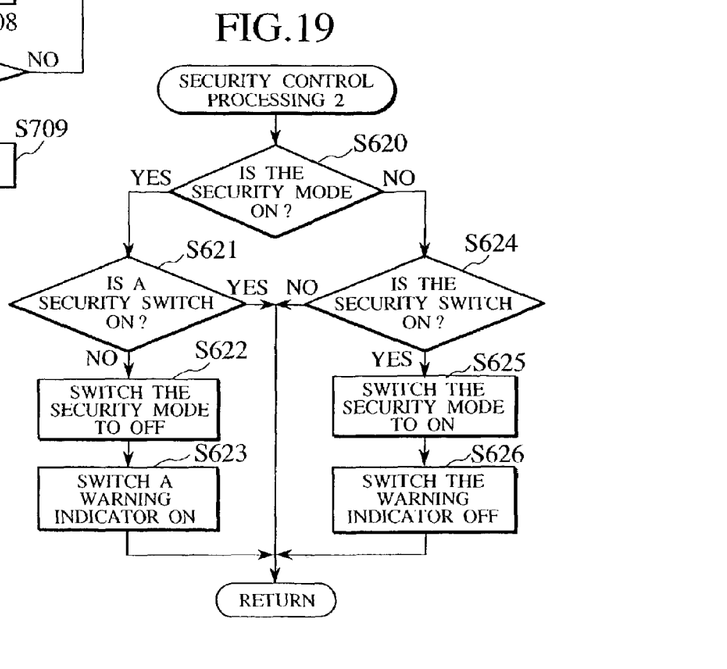
FIG. 19 is a flowchart detailing another part of the processing shown in FIG. 17.

FIG. 19 illustrates the details on the security control processing 2 (S62). To begin with, in step S620, a current state of the security mode is judged. If the security mode is on, the process proceeds to step S621. If the security mode is off, the process proceeds to step S624.

In step S621, a state of the security mode setting switch 401 is judged. If the security mode setting switch 401 is judged to be in a cancelled state, in other words, if the security mode setting switch 401 is off, information that the security mode is off is stored in the nonvolatile memory 306 in step S622. Next, in step S623, the warning indicator 402 is switched on before the security control processing 2 ends. In step S621, a state of the security mode setting switch 401 is judged. If the security mode setting switch 401 is judged to be in a set state, the security control processing 2 ends as it is because it is the same as a current state.

In step S624, a state of the security mode setting switch 401 is judged. If the security mode setting switch 401 is judged to be in a set state (ON), information that the security mode is on is stored in the nonvolatile memory 306 in step S625. Next, in step S626, the warning indicator 402 is switched off before the security control processing 2 ends. In step S624, a state of the security mode setting switch 401 is judged. If the security mode setting switch 401 is judged to be in a cancelled state (OFF), the security control processing 2 ends as it is because it is the same as a current state.

According to this embodiment, even an unregistered person can drive an automobile.

As described above, according to the present invention, since a biological authentication device itself is protected from mischief and intentional damage, and biological information is prevented from being easily registered by someone else, a security level required when an engine is started is enhanced. In addition, since a key for switching to a biological information registration mode and a key for starting an engine are used separately, and registration is performed outside an automobile, biological information can be registered with ease. Since biological information is a finger-vein pattern, individual authentication becomes easy. Moreover, quick starting of an engine in an urgent situation becomes possible while a high level security is kept.

is possible to achieve an engine starting system that facilitates registration of biological information while increasing security of an automobile, and that realizes quick starting in the event of an emergency.

What is claimed is:

1. An engine starting system comprising:
an ignition switch unit for controlling a state of an automobile;
a key for changing a state of the ignition switch;
a biological information input unit for receiving individual biological information;
a biological information authenticating unit including at least a biological information storing unit for holding the individual biological information which has been registered prior to use of the engine starting system to authenticate the inputted biological information; and
a biological information registration unit for registering the individual biological information;
wherein the key is used to start the biological information input unit, and the biological information authenticating unit authenticates the inputted individual biological information by referencing the registered individual biological information before the key is used to start an engine,
wherein a cover unit of said biological information input unit is unlocked when the ignition switch is in an ON state, and
when the ignition switch is in a state other than the ON state, or when individual authentication is completed, the cover unit is locked.

2. An engine starting system according to claim 1, wherein the biological information is a finger-vein pattern.

3. An engine starting system comprising:
an ignition switch unit for controlling a state of an automobile;
a key for changing a state of the ignition switch;
a biological information input unit for receiving biological information;
a biological information authenticating unit including at least a biological information storing unit for holding biological information which has been registered prior to use of the engine starting system to authenticate the inputted biological information; and
a biological information registration unit for registering biological information;
wherein the key is used to start the biological information input unit, and the biological information authenticating unit authenticates the inputted biological information by referencing the registered biological information before the key is used to start an engine;
wherein said biological information input unit includes at least a sensor unit for receiving biological information, a selectably movable and lockable cover unit for covering and preventing access to the sensor unit, and a trigger unit for instructing reception of the biological information;
wherein said trigger unit starts the biological authentication, and the biological information is subsequently obtained to collate the obtained biological information with the registered biological information before the engine is started; and
wherein said cover unit is configured to prevent at least infrared rays from passing therethrough.

4. An engine starting system comprising:
an ignition switch unit for controlling a state of an automobile;
a key for changing a state of the ignition switch;
a biological information input unit for receivina individual biological information;
a biological information authenticating unit including at least a biological information storing unit for holding the individual biological information which has been registered prior to use of the engine starting system to authenticate the inputted biological information: and
a biological information registration unit for registering the individual biological information:
wherein the key is used to start the biological information input unit, and the biological information authenticating unit authenticates the inputted individual biological information by referencing the registered individual biological information before the key is used to start an engine, and upon the ignition switch being in an ON state, the system is configured to provide a term of validity as a result of the authentication by the authenticating unit so that during the term the engine, if stopped without using the key, can be restarted without performing biological authentication, and
wherein the term of validity resulting from the authentication performed by the biological information authenticating unit is effective for a given period of time only while the key is in the ON state.

5. An engine starting system according to claim 4, wherein when the ignition switch enters a state other than the ON state, the term of validity is ended and individual authentication is thereafter required.

6. An engine starting system according to claim 4, wherein if engine start time is within the term of validity, the engine is started without performing individual authentication.

* * * * *